US010969656B2

(12) United States Patent
Kei

(10) Patent No.: US 10,969,656 B2
(45) Date of Patent: Apr. 6, 2021

(54) ELECTRONIC APPARATUS INCLUDING MOVABLE DISPLAY SECTION

(71) Applicant: CANON KABUSHIKI KAISHA, Tokyo (JP)

(72) Inventor: Hidetoshi Kei, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/682,045

(22) Filed: Nov. 13, 2019

(65) Prior Publication Data

US 2020/0159086 A1 May 21, 2020

(30) Foreign Application Priority Data

Nov. 21, 2018 (JP) .............................. JP2018-218368

(51) Int. Cl.
*G03B 13/02* (2021.01)
*H04N 5/225* (2006.01)
*G03B 17/04* (2021.01)
*G03B 13/04* (2021.01)

(52) U.S. Cl.
CPC ............ *G03B 13/02* (2013.01); *G03B 17/04* (2013.01); *H04N 5/225251* (2018.08); *G03B 13/04* (2013.01)

(58) Field of Classification Search
CPC ........ G03B 13/02; G03B 13/04; G03B 13/10; G03B 15/03; G03B 15/0484; G03B 15/05; G03B 17/04; H04N 5/2252; H04N 5/22525; H04N 5/225251
USPC ....................................................... 396/383
See application file for complete search history.

(56) References Cited

U.S. PATENT DOCUMENTS

| 4,545,667 | A | * | 10/1985 | Niwa | ..................... | G03B 17/02 396/165 |
| 5,543,875 | A | * | 8/1996 | MacHida | ................. | G02B 7/10 396/177 |
| 5,659,826 | A | * | 8/1997 | Kameyama | ............ | G03B 13/12 396/378 |
| 5,701,535 | A | * | 12/1997 | Reibl | ..................... | G03B 13/06 396/348 |
| 6,510,286 | B1 | * | 1/2003 | Terada | ................... | G03B 15/05 396/177 |

(Continued)

FOREIGN PATENT DOCUMENTS

JP 2015025838 A 2/2015
JP 2015227901 A 12/2015

*Primary Examiner* — Christopher E Mahoney
(74) *Attorney, Agent, or Firm* — Rossi, Kimms & McDowell LLP

(57) ABSTRACT

A movable unit of an electronic apparatus is movable between an accommodated position within an apparatus body and a use position projected therefrom. The movable unit popped up by pop-up springs are further popped up by an assist lever and a toggle spring. The toggle spring urges the assist lever in a first arc direction and urges the same in a second arc direction opposite to the first arc direction after passing an inflexion point. The assist lever is brought into contact with a first latching pin when the movable unit reaches an end point of a movement stroke After the movable unit has reached the end point of the movement stroke, the assist lever is brought into contact with the first latching pin to urge the movable unit in the same direction as urged by the pop-up spring.

11 Claims, 9 Drawing Sheets

(56) References Cited

U.S. PATENT DOCUMENTS

| | | |
|---|---|---|
| 10,241,382 B2 | 3/2019 | Sato |
| 2007/0115382 A1* | 5/2007 | Fukuma ................ G03B 17/04 |
| | | 348/333.06 |
| 2012/0224351 A1* | 9/2012 | Lin ....................... G03B 15/05 |
| | | 362/5 |
| 2019/0289182 A1* | 9/2019 | Kei ..................... H04N 5/2252 |
| 2020/0099863 A1* | 3/2020 | Osada ............. H04N 5/225251 |

* cited by examiner

ELECTRONIC APPARATUS INCLUDING MOVABLE DISPLAY SECTION

BACKGROUND OF THE INVENTION

Field of the Invention

The present invention relates to an electronic apparatus including a display section that is movable between an accommodated position within an apparatus body and a use position in which the display section is projected from the apparatus body.

Description of the Related Art

There is known a digital camera that includes a movable part provided such that it is projectable from an apparatus body, rotatably holds the movable part by two link members, and is capable of moving the movable part by a plurality of springs to a use position in which the movable part is projected. The digital camera is disclosed in Japanese Laid-Open Patent Publication (Kokai) No. 2015-025838, Further, there is known an image pickup apparatus that includes a viewfinder capable of shifting its state between an accommodated state in which the viewfinder is accommodated in an apparatus body and a use state in which the viewfinder is projected. The image pickup apparatus is disclosed in Japanese Laid-Open Patent Publication (Kokai) No. 2015-227901, However, in the digital camera described in Japanese Laid-Open Patent Publication (Kokai) No. 2015-025838, the movable part is held via the plurality of link members, which increases the number of components, and makes the construction complicated, and hence it is difficult to reduce the size of the apparatus itself.

Further, in the image pickup apparatus described in Japanese Laid-Open Patent Publication (Kokai) No. 2015-227901, the viewfinder is slid and moved to the position in which the viewfinder is projected from the apparatus body, by causing a base frame fixed to the apparatus body and a slide frame of the movable part to urge each other, using tension springs. For this reason, there is a fear that if a sliding amount of the movable part is increased, it is necessary to increase the equilibrium length of the springs in the accommodated state, and this increases impact caused when operating the movable part, which degrades the quality of the image pickup apparatus.

SUMMARY OF THE INVENTION

The present invention provides an electronic apparatus equipped with a pop-up mechanism that is capable of increasing the sliding amount of a movable member while suppressing impact caused when the movable member moves without increasing the size of the apparatus.

The present invention provides an electronic apparatus comprising an apparatus body, a movable member configured to be movable between an accommodated position within the apparatus body and a use position in which the movable member is projected from the apparatus body, a fixed member configured to slidably hold the movable member and fixed to a predetermined position in the apparatus body, an urging unit configured to urge the movable member from the accommodated position toward the use position, a lever member rotatably held by the fixed member, a first latching member fixed to the movable member, an urging member that has one end engaged with the lever member and the other end engaged with the fixed member, and urges the lever member such that the lever member is caused to be rotated, wherein the urging member urges the lever member in a first arc direction, and urges the lever member in a second arc direction opposite to the first arc direction after passing an inflexion point, wherein the lever member includes a contact portion that is brought into contact with the first latching member when the movable member reaches an end point of a movement stroke by which the movable member is moved by an urging force of the urging unit, and wherein the lever member is brought into contact with the first latching member to urge the movable member in a direction opposite to a direction in which the movable member is urged by the urging unit, before the movable member reaches the end point of the movement stroke, and after the movable member has reached the end point of the movement stroke, the lever member is in contact with the first latching member to urge the movable member in the same direction as the direction in which the movable member is urged by the urging unit.

According to the present invention, the lever member and the urging member are combined, and after the movable member has reached an end point of a range over which the movable member is moved by the urging unit, the movable member is urged by the lever member in the same direction as the direction in which the movable member is urged by the urging unit. This makes it possible to provide the electronic apparatus equipped with the pop-up mechanism that is capable of achieving, with a space-saved construction, a large sliding amount of the movable member while suppressing impact caused when it is moved.

Further features of the present invention will become apparent from the following description of exemplary embodiments (with reference to the attached drawings).

DESCRIPTION OF THE EMBODIMENTS

Figure 1A:
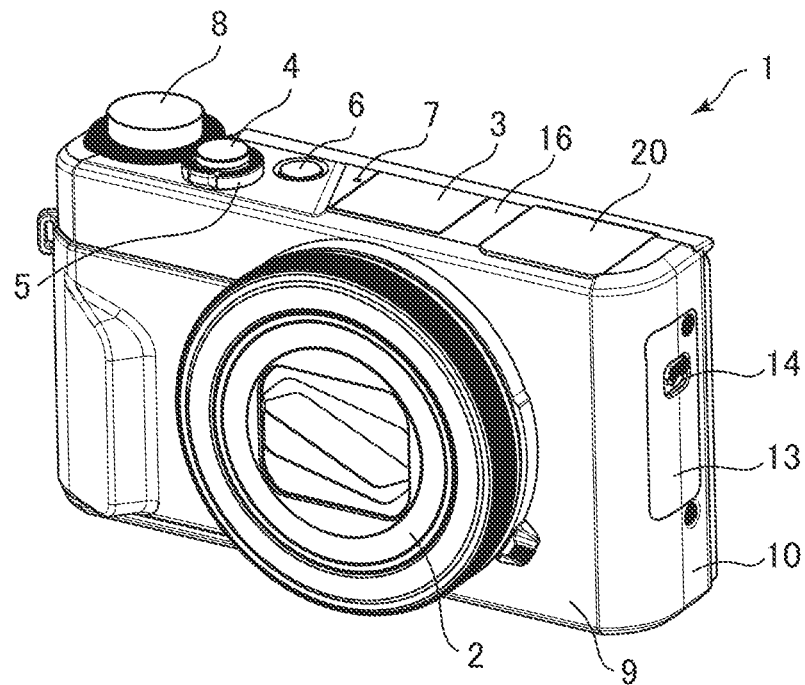
FIGS. 1A and 1B are perspective views of an image pickup apparatus as an electronic apparatus according to an embodiment of the present invention.

The present invention will now be described in detail below with reference to the accompanying drawings showing embodiments thereof. Note that in the following description, the same members illustrated over a plurality of figures are denoted by the same reference numerals, and redundant description is omitted.

Figure 1B:
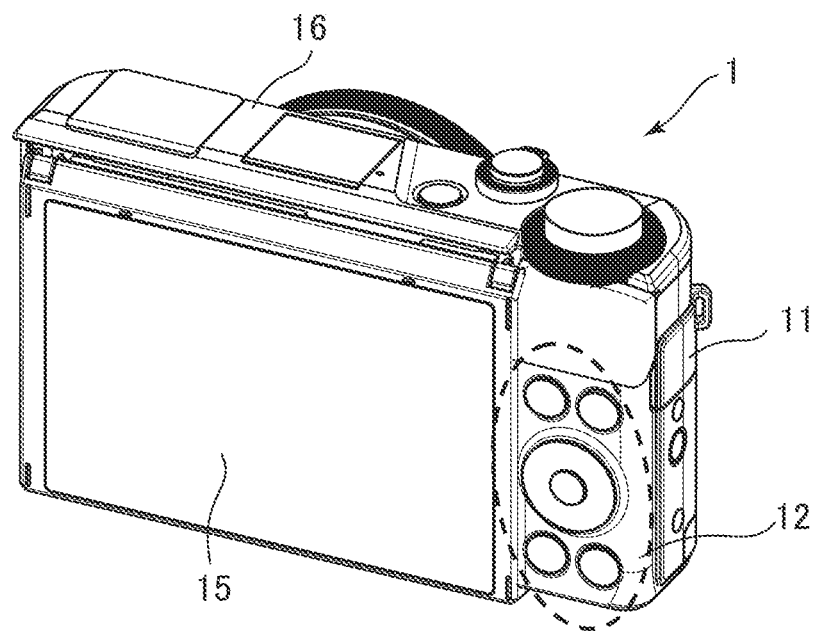

FIGS. 1A and 1B are a front perspective view and a rear perspective view of an image pickup apparatus as an electronic apparatus according to an embodiment of the present invention, respectively. Referring to FIGS. 1A and 1B, the image pickup apparatus, denoted by reference numeral 1, includes a top cover 16, a front cover 9, and a rear cover 10 that cover a top side, a front side, and a rear side of the apparatus, respectively, and form the appearance of the same. The top cover 16 is formed with openings for an electronic viewfinder 20 and a strobe device 3, described hereinafter.

The image pickup apparatus 1 includes a barrel unit 2 disposed in the front side of the image pickup apparatus 1, and includes, in the top surface of the same, the strobe device 3 and the electronic viewfinder 20, which are provided such that they are each capable of being popped up, a power button 6, a release button 4, a mode setting dial 8, and a microphone hole 7. A zoom lever 5 is rotatably provided around the release button 4. The barrel unit 2 includes an image pickup optical system (not shown) and is of a retractable type in which, when accommodated, the barrel unit 2 is retracted within an apparatus body, i.e. inside the image pickup apparatus 1.

Further, the image pickup apparatus 1 includes an image pickup device, not shown. The image pickup device is implemented e.g. by a CCD or CMOS image sensor, and generates image data by photoelectrically converting an optical image of an object formed through the image pickup optical system of the barrel unit 2. In the image pickup apparatus 1, there are mounted a main circuit board equipped with a processing circuit for converting image data generated by the image pickup device into digital information and an auxiliary circuit board (neither of which is shown).

The strobe device 3 is a movable member, which is incorporated in the image pickup apparatus 1, and is configured to be popped up and emit light in a case where brightness of an object is insufficient at the time of photographing. The release button 4 is configured such that 2-step pressing operations, i.e. operations for pressing the same into a half-pressed state (state in which a switch 1, not shown, is ON) and into a fully pressed state (state in which a switch 2, not shown, is ON), can be performed. When the release switch 4 is fully pressed, an object is photographed, and image data of the object image is recorded in a recording medium (not shown).

By rotating the zoom lever 5 in one direction, a zoom operation toward a telephoto side (in a direction of narrowing an angle of view) is performed, and by rotating the same in the other direction, a zoom operation toward a wide side (in a direction of widening an angle of view) is performed. The power button 6, when pressed by a photographer, switches the image pickup apparatus 1 from an off-state, i.e. a non-use state to an on-state in which the image pickup apparatus 1 can be used, or switches the same from the on-state to the off-state.

The microphone hole 7 is provided in an upper portion of the image pickup apparatus 1 by considering sound collection property, and functions to guide sound into a microphone incorporated in the image pickup apparatus 1. The mode setting dial 8 is rotatably supported. On a top surface of the mode setting dial 8, a plurality of icons (not shown) corresponding to various photographing modes are printed, and by adjusting a selected one of these icons to an indicator (not shown) formed on the image pickup apparatus 1, it is possible to set the image pickup apparatus 1 to an associated one of the various photographing modes corresponding to the selected icon.

The electronic viewfinder 20 as a movable member is configured to be movable between an accommodated position and a use position. More specifically, when the electronic viewfinder 20 is not used, the electronic viewfinder 20 is accommodated in the accommodated position within the image pickup apparatus 1, whereas when the electronic viewfinder 20 is used, the electronic viewfinder 20 is popped up (projected) to an upper position from the image pickup apparatus 1, thereby being moved to the use position where it is used. While the electronic viewfinder 20 is accommodated in the image pickup apparatus 1, the electronic viewfinder 20 is in a state fixed to the accommodated position in the image pickup apparatus 1 by a lock mechanism.

A main battery (not shown) serving as a power source and a recording medium (not shown) for recording photographed object images are incorporated in the image pickup apparatus 1. A side surface of the image pickup apparatus 1 is provided with jacks (not shown) for inputting and outputting power supply and signals, and these jacks are covered by a jack cover 11 for protection thereof. When the jack cover 11 is opened, the jacks for input and output are exposed to enable various cables to be inserted therein and removed therefrom.

A rear surface of the image pickup apparatus 1 is provided with a display device 15 and an operation button group 12. The operation button group 12 is formed by a plurality of operation buttons and a cross button disposed in the center thereof. The operation buttons of the operation button group 12 are used when inputting various instructions, such as an instruction for changing a photographing condition and an instruction for switching the display to a reproduction screen.

The display device 15 is used to check an object image to be photographed and perform reproduction display of a photographed image. As the display device 15, a liquid crystal display, for example, is used. The display device 15 is mounted on the main body of the image pickup apparatus 1 such that it can be subjected to a tilt operation via a hinge device (not shown).

On a side surface of the image pickup apparatus 1, which is opposite to the above-mentioned jack cover 11, a side cover 13 forming part of the appearance surface is arranged astride the front cover 9 and the rear cover 10. The side cover 13 has a release lever 14 provided therein such that the release lever 14 is slidably operated, and by operating the release lever 14, the electronic viewfinder 20 is unlocked to perform a pop-up operation. Details of the pop-up operation of the electronic viewfinder 20 will be described hereinafter.

Figure 2A:
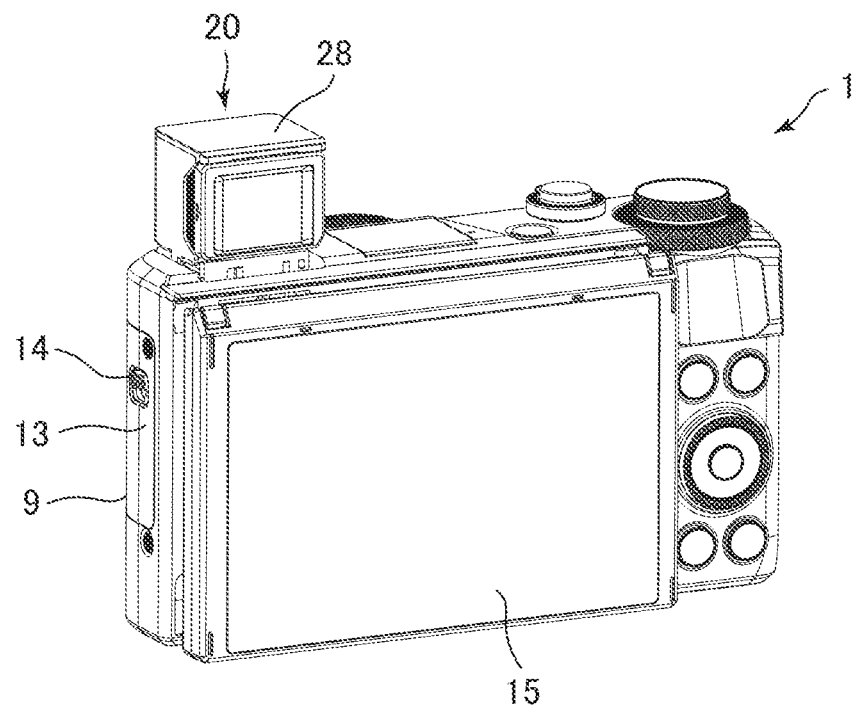
FIGS. 2A and 2B are perspective views of the image pickup apparatus in a state in which an electronic viewfinder has been popped up.
Figure 2B:
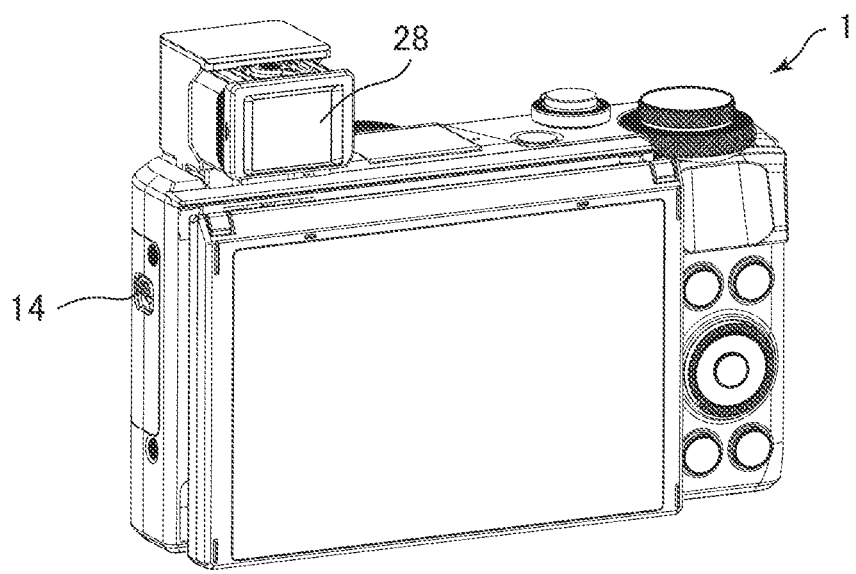

Next, the electronic viewfinder 20 in the image pickup apparatus 1, shown in FIGS. 1A and 1B, will be described. FIGS. 2A and 2B are perspective views of the image pickup apparatus 1 in a state in which the electronic viewfinder has been popped up. FIG. 2A shows a state in which the electronic viewfinder 20 has been popped up from the image pickup apparatus 1 to the upper position, and FIG. 2B shows a state in which an eyepiece 28 of the electronic viewfinder 20 has been popped up toward the rear side of the image pickup apparatus 1.

Referring to FIG. 2A, the electronic viewfinder 20 has been popped up from the image pickup apparatus 1 to the upper position. As described above, by operating the release lever 14 disposed on a side of the image pickup apparatus 1, the electronic viewfinder 20 is popped up from the accommodated position (see FIGS. 1A and 1B) where the electronic viewfinder 20 is accommodated in the image pickup apparatus 1, to the use position (see FIG. 2A).

FIG. 2B shows a state in which, further from the popped-up state of the electronic viewfinder 20 (see FIG. 2A), the eyepiece 28 of the electronic viewfinder 20 has been further drawn out toward the rear side of the image pickup apparatus 1. Referring to FIG. 2B, the electronic viewfinder 20 is in a usable state in which the eyepiece 28 has been drawn out to the near side, and a photographer (user) can perform checking of an object image to be photographed, confirming a photographed image subjected to reproduction display, and so forth, from the eyepiece 28.

The image pickup apparatus 1 is provided with a sensor (not shown) for detecting that the eyepiece 28 has been drawn out, and when it is detected by the sensor that the eyepiece 28 has been drawn out toward the near side (photographer side), the display is switched between the display device 15 and the electronic viewfinder 20. More specifically, in a case where it is detected by the sensor that the eyepiece 28 has been drawn out, an image is displayed on the electronic viewfinder 20, and in a case where the eyepiece 28 has been accommodated in the electronic viewfinder 20, the image is displayed on the display device 15 on the rear side of the image pickup apparatus. Note that the method of switching the display between the display device 15 and the electronic viewfinder 20 is not limited to the above-described method. For example, an infrared proximity sensor may be provided in the vicinity of the eyepiece 28, and when it is detected by the infrared proximity sensor that a photographer has looked through the eyepiece 28, the display may be switched from the display device 15 to the electronic viewfinder 20.

Next, the construction of the electronic viewfinder 20 will be described in detail.

Figure 3:
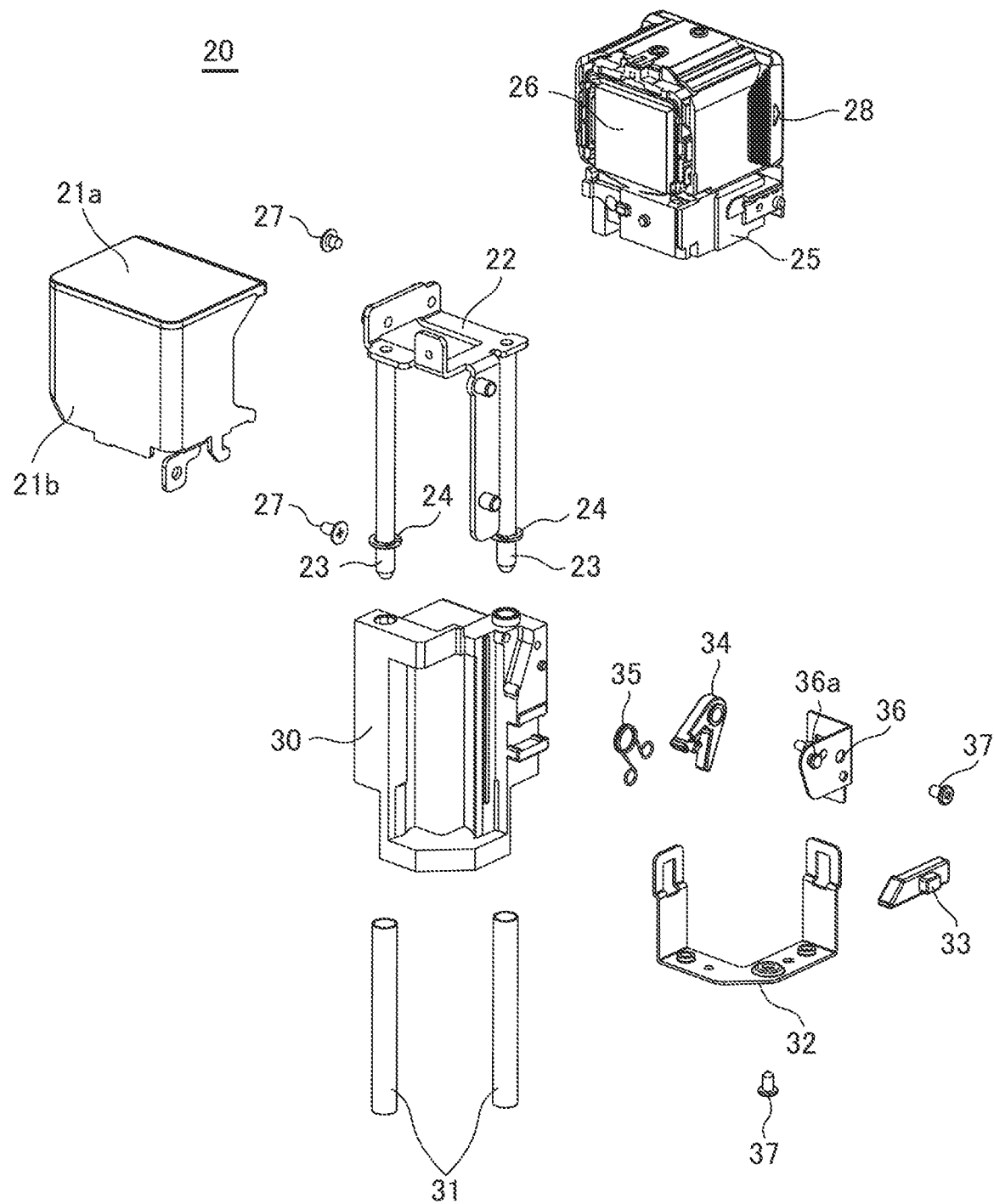
FIG. 3 is an exploded perspective view of the electronic viewfinder.

FIG. 3 is an exploded perspective view of the electronic viewfinder 20. The electronic viewfinder 20 includes a top cover 21a that covers a top side and forms the appearance thereof and a side cover 21b that covers lateral sides and forms the appearance thereof. The eyepiece 28 supported by an EVF case 25 and a display panel 26 formed on a surface opposite to the eyepiece 28 are accommodated in a space surrounded by the top cover 21a and the side cover 21b.

A circuit board (not shown) is disposed in a lower portion of the EVF case 25, and a flexible circuit board (not shown) for transmitting image signals from the main circuit board in the image pickup apparatus 1 is connected to the circuit board. The image signals are transmitted to the display panel 26 via the flexible circuit board (not shown). An optical lens group (not shown) is accommodated inside the EVF case 25 and enables a user to check an image displayed on the display panel 26 by looking through the eyepiece 28. The EVF case 25 supporting the display panel 26 and the eyepiece 28 is fixed to a base plate 22, together with the side cover 21b, by a plurality of fastening screws 27.

The base plate 22 is formed of a sheet metal material and two guide bars 23 each formed of a metallic material are swaged to the base plate 22. An E ring 24 is fixed in a groove formed in the vicinity of a lower end of each of the two guide bars 23. Each E ring 24 has a flange shape formed to radially extend.

The two guide bars 23 swaged to the base plate 22 extend through an EVF holder 30 serving as a fixed member. The EVF holder 30 is formed of a resin material and holds the base plate 22 such that the base plate 22 is slidable in a vertical direction. When assembling the electronic viewfinder 20, the guide bars 23 are inserted through the EVF holder 30 and then the E rings 24 are fixed in the grooves formed in the vicinity of the respective lower ends of the guide bars 23, whereby the guide bars 23 are prevented from being moved out of the EVF holder 30 when a sliding operation is performed. The EVF holder 30 is positioned and fixed with respect to the front cover 9 (see FIG. 1A). That is, the EVF holder 30 is a fixed member fixed to a predetermined position in the main body of the image pickup apparatus 1.

Inside the EVF holder 30, pop-up springs 31 as urging means are accommodated. The pop-up springs 31 urge the electronic viewfinder 20 supported by the guide bars 23 from the accommodated position in the apparatus body toward the use position in which it is projected from the apparatus body.

A spring holder 32 formed of a sheet metal material is fixed to the EVF holder 30 such that the spring holder 32 holds ends of the pop-up springs 31. Further, the EVF holder 30 is provided with a lock lever 33 configured to be slidable in a predetermined direction with respect to the EVF holder 30. The lock lever 33 locks the electronic viewfinder 20, held in the state accommodated in the image pickup apparatus 1, in the accommodated position. When using the electronic viewfinder 20, by operating the above-mentioned release lever 14, the lock lever 33 is slid, whereby the electronic viewfinder 20 is released from the locked state and is popped up from the image pickup apparatus 1.

As component members for further popping up the electronic viewfinder 20 popped up by the pop-up springs 31, an assist lever 34 and a toggle spring 35 are provided. The assist lever 34 as a lever member is rotatably held by a holding plate 36 fixed to a side surface of the EVF holder 30 by a fastening screw 37. The toggle spring 35 as an urging member has one end engaged with one end of the assist lever 34, and the other end engaged with a pin 36a of the holding plate 36 fixed to the EVF holder 30. The pin 36a is swaged to the holding plate 36.

Next, a movable part of the electronic viewfinder 20 and the assist lever 34 will be described.

Figure 4A:
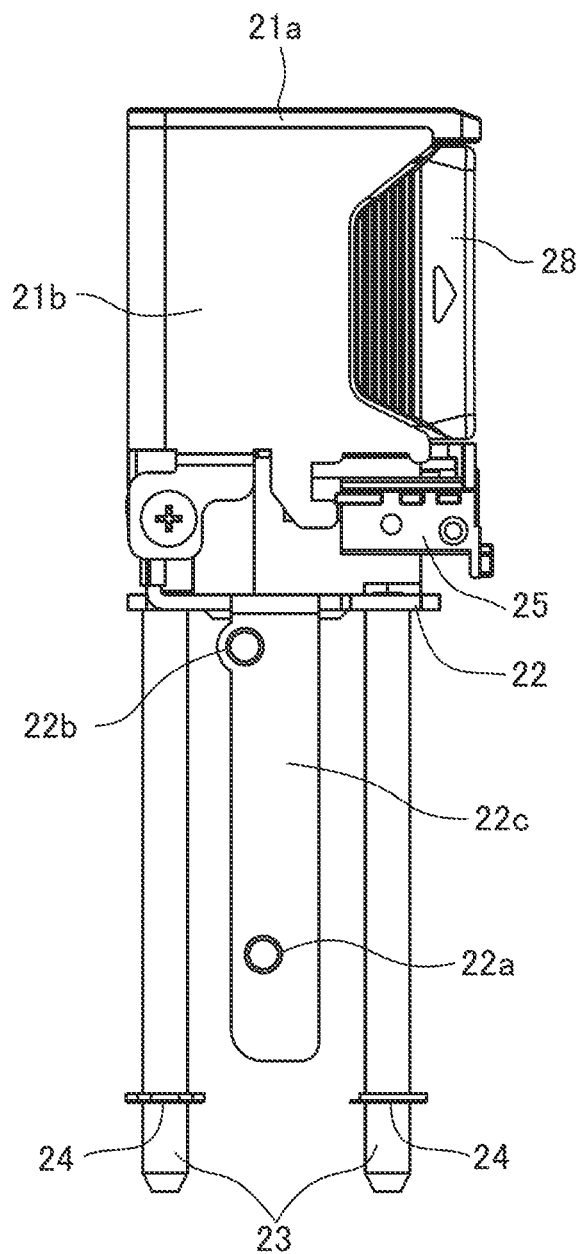
FIGS. 4A and 4B are views showing a movable unit of the electronic viewfinder and an assist lever, respectively.
Figure 4B:
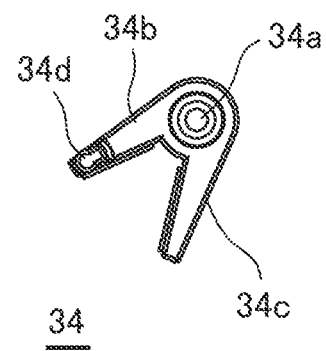

FIGS. 4A and 4B are views showing the movable part of the electronic viewfinder 20 and the assist lever 34, respectively. The movable part of the electronic viewfinder 20 is a term collectively referring to component members of the electronic viewfinder 20 that moves from the accommodated position to the use position when the electronic viewfinder 20 is operated, and is hereinafter referred to as the movable unit. The movable unit includes the display panel 26, the eyepiece 28, the EVF case 25 supporting the display panel 26 and the eyepiece 28, the base plate 22 on which the EVF case 25 is fixed, an arm portion 22c extending downward from the base plate 22, and the guide bars 23. Note that in the following description, the movable unit of the electronic viewfinder 20 is denoted by the same reference numeral "20" as the electronic viewfinder for convenience sake.

In the movable unit 20 shown in FIG. 4A, the EVF case 25 supporting the eyepiece 28 is fixed to the base plate 22 in a state covered by the top cover 21a and the side cover 21b. The base plate 22 has the arm portion 22c extending downward, and the arm portion 22c has a first latching pin 22a and a second latching pin 22b, respectively swaged to a lower portion and an upper portion of the arm portion 22c with a space interval in the moving direction. The first latching pin 22a as a latching member is engaged with the lock lever 33 (see FIG. 3) in a pop-down position to thereby hold the movable unit 20 in the accommodated position in the image pickup apparatus 1.

Referring to FIG. 4B, the assist lever 34 is the lever member held rotatable about a rotational shaft 34a. The assist lever 34 has a first contact portion 34b and a second contact portion 34c, which are brought into contact with the first latching pin 22a when the movable unit 20 moves. Shock-absorbing members, referred to hereinafter, are affixed to surfaces of the first contact portion 34b and the second contact portion 34c which are brought into contact with the first latching pin 22a. A tip end of the first contact portion 34b is formed with a pawl 34d for catching one end of the above-mentioned toggle spring 35 to be engaged therewith (see FIG. 3).

The pop-up operation of the movable unit constructed as described above will be described hereinafter in detail with reference to FIGS. 5A to 7D.

Figure 5A:
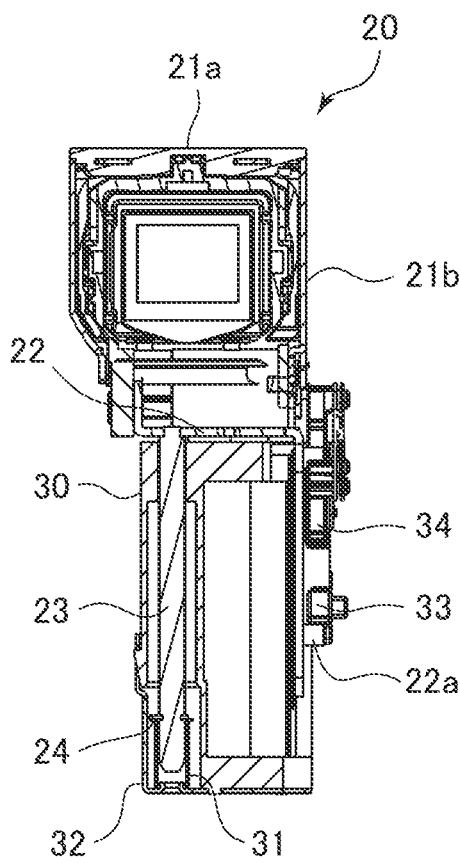
FIGS. 5A and 5B are cross-sectional views of the electronic viewfinder, showing a popped-down state and a popped-up state, respectively.
Figure 5B:
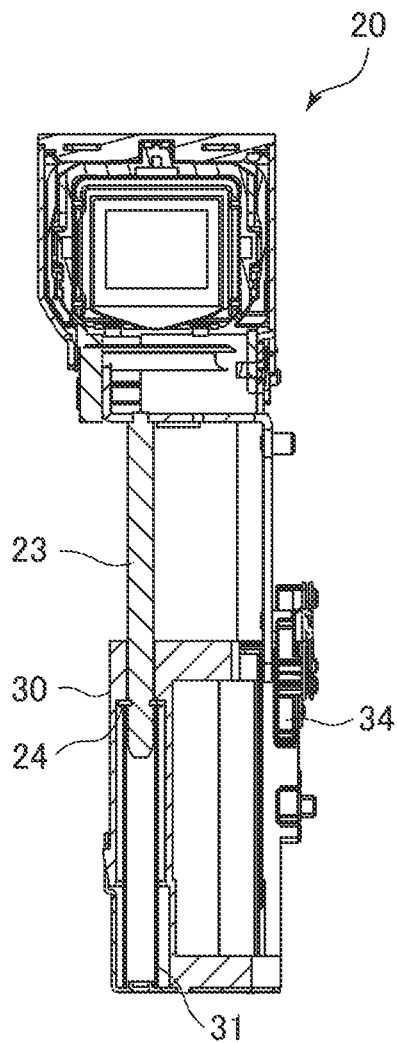

FIGS. 5A and 5B are respective cross-sectional views of the electronic viewfinder, in a popped-down state and a popped-up state. Referring to FIG. 5A, the electronic viewfinder 20 is in the popped-down state (accommodated state), and is held in the accommodated position in a state in which the first latching pin 22a of the base plate 22 is latched by the lock lever 33. At this time, the E rings 24 of the guide bars 23 are pushed upward by the pop-up springs 31, and hence the movable unit 20 is urged in the direction toward the use position. In the accommodated state of the movable unit 20, each pop-up spring 31 is in a state compressed to the maximum so that the spring load takes a maximum value.

On the other hand, referring to FIG. 5B, the electronic viewfinder 20 is in the popped-up state and the E rings 24 of the guide bars 23 pushed upward by the pop-up springs 31 are brought into abutment with the upper part of the EVF holder 30 and stopped. In the popped-up state of the movable unit 20, each pop-up spring 31 is in a state extended to the maximum so that the spring load takes a minimum value.

Figure 6D:
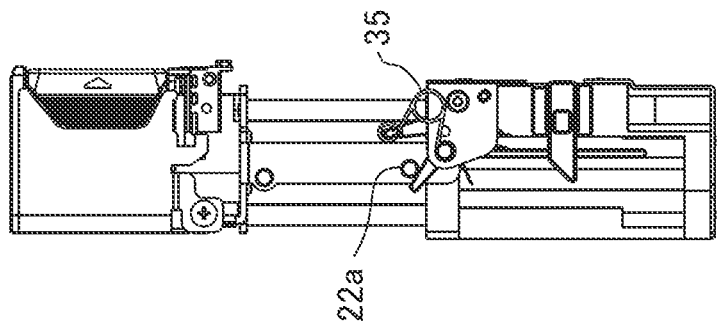
FIGS. 6A to 6D are views useful in explaining the operation of the assist lever, which is performed when the movable unit of the electronic viewfinder is shifted from the popped-down state to the popped-up state.

FIGS. 6A to 6D are views useful in explaining the operation of the assist lever 34, performed when the movable unit 20 of the electronic viewfinder is shifted from the popped-down state (see FIG. 6A) to the popped-up state (see FIG. 6D). Further, FIGS. 7A to 7D are views useful in explaining the operations of the assist lever 34 and the toggle spring 35, which correspond to the states shown in FIG. 6A to 6D, respectively.

Figure 6C:
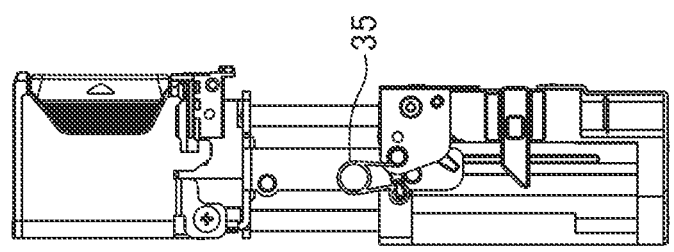
Figure 6B:
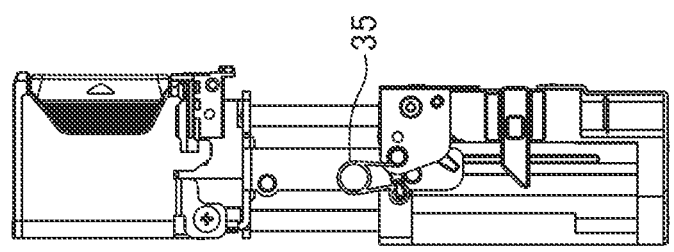
Figure 6A:
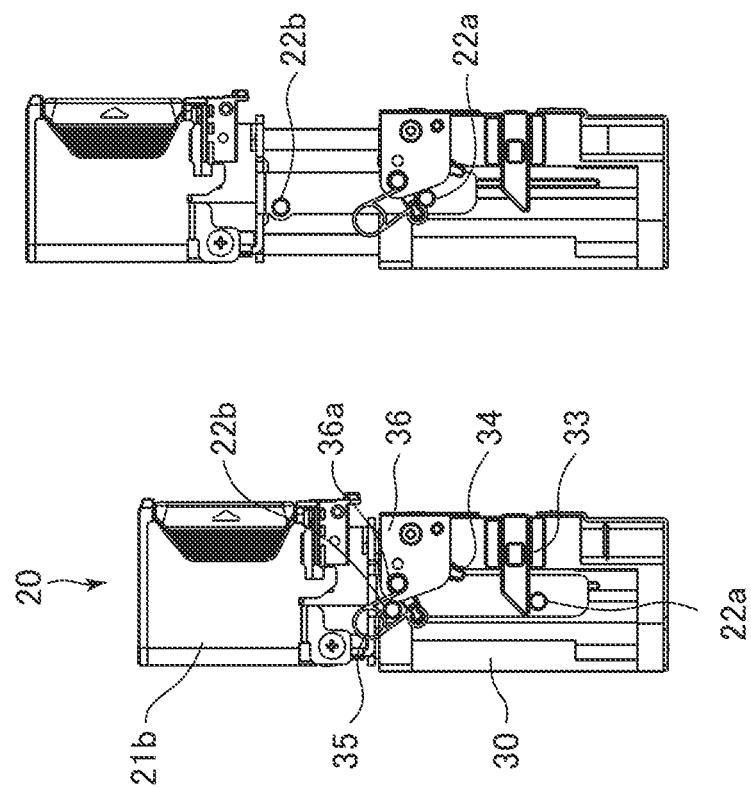

Referring to FIG. 6A, the movable unit 20 is in the popped-down state, and the lock lever 33 is engaged with the first latching pin 22a of the base plate 22, whereby the movable unit 20 maintains its stopped state. At this time, the second latching pin 22b of the base plate 22 is positioned immediately above the first contact portion 34b of the assist lever 34 as shown in FIG. 7A, and prevents the assist lever 34 from rotating upward.

The toggle spring 35 has an Ω shape, and has one end (left end, as viewed in FIG. 7A) engaged with the pawl 34d at the tip end of the first contact portion 34b of the assist lever 34. That is, the pawl 34d functions as an engagement portion for engagement between the assist lever 34 and the toggle spring 35. On the other hand, the other end (right end, as viewed in FIG. 7A) of the toggle spring 35 is engaged with the swaged pin 36a of the holding plate 36 (see FIG. 3) fixed to the EVF holder 30. Therefore, the right end position of the toggle spring 35 is fixed. On the other hand, the left end position of the toggle spring 35 is changed upward in accordance with rotation of the assist lever 34 pushed up by the first latching pin 22a that moves upward when the electronic viewfinder 20 is popped up.

Figure 7A:
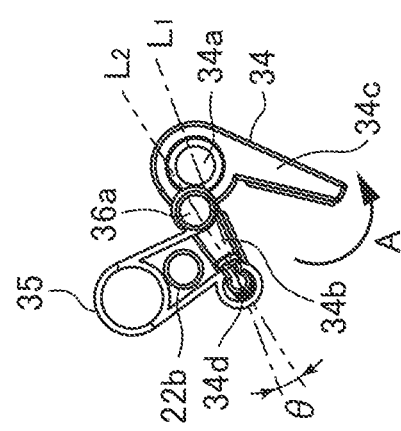
FIGS. 7A to 7D are views useful in explaining the operations of the assist lever and a toggle spring, which correspond to the states shown in FIG. 6A to 6D, respectively.

In the state shown in FIG. 6A, in which the movable unit 20 is in the accommodated position in the apparatus body, the toggle spring 35 and the assist lever 34 are in a positional relationship shown in FIG. 7A. More specifically, a straight line L1 (one-dot chain line) connecting the center of the rotational shaft 34a of the assist lever 34 and the center of the pawl 34d at the tip end of the first contact portion 34b, and a straight line L2 (two-dot chain line) connecting the centers of the right and left ends of the toggle spring 35 cross at an angle θ. At this time, the one-dot chain line L1 and the two-dot chain line L2 both incline downward toward the left side, and the inclination angle of the two-dot chain line L2 is larger than the inclination angle of the one-dot chain line L1.

The toggle spring 35 acts to increase a space interval between its left end (point of action) and its right end (fulcrum). Therefore, in the state shown in FIG. 7A, a downward force F1 as a component force of an acting force F of the toggle spring 35 acts on the pawl 34d (point of action), and as a result, moment for rotating the assist lever 34 in a direction (first arc direction) indicated by an arrow A acts. Note that at this time, the assist lever 34 urged by the toggle spring 35 is stationary in a state brought into abutment with an end face of the EVF holder 30.

Figure 7B:
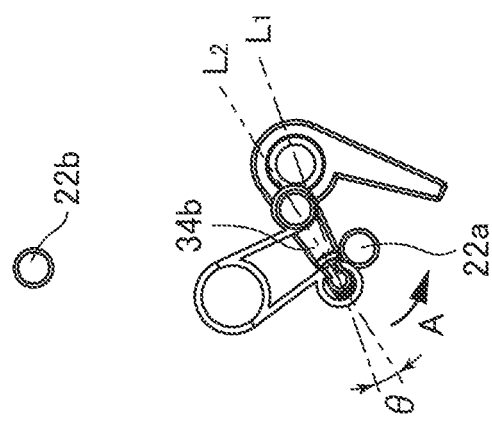

Next, FIG. 6B shows an intermediate state in which the movable unit 20 is being popped up from the popped-down state shown in FIG. 6A by releasing the lock lever 33. In this state, the movable unit 20 has been pushed up by the extending pop-up springs 31 and has been moved upward by a predetermined stroke. Further, the first latching pin 22a of the movable unit 20 has risen from the position shown in FIG. 6A and is brought into contact with a lower surface of the first contact portion 34b of the assist lever 34. At this time, as shown in FIG. 7B, the crossing angle θ formed by the one-dot chain line L1 and the two-dot chain line L2, mentioned above, remains the same, similar to the case shown in FIG. 7A. Therefore, downward moment for rotating the assist lever 34 in the direction indicated by the arrow A acts on the pawl 34d of the assist lever 34, similar to the case shown in FIG. 7A.

Figure 7C:
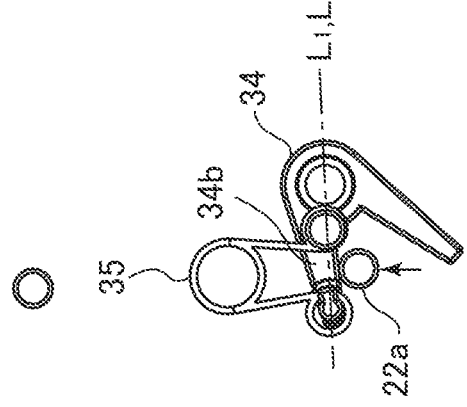

Then, FIG. 6C shows an intermediate state in which the movable unit 20 has further risen from the state shown in FIG. 6B. When the movable unit 20 further rises from the state shown in FIG. 6B by receiving action of the pop-up springs 31, the first latching pin 22a pushes the pawl 34d of the assist lever 34 upward against the downward component force F1 applied by the toggle spring 35, as shown in FIG. 7C. This is because the upward force applied by the extending pop-up springs 31 is larger than the downward component force F1 applied by the toggle spring 35 in this state.

In the present embodiment, a stroke by which the movable unit 20 is moved by the urging force of the pop-up springs 31 from the accommodated position, shown in FIG. 6A, to a position where the first latching pin 22a pushes up the pawl 34d of the assist lever 34 to the FIG. 7C state is referred to as the pop-up spring movement stroke. The downward component force F1, applied by the toggle spring 35, which acts on the pawl 34d when the movable unit 20 rises to reach the end point of the pop-up spring movement stroke, acts in a direction opposite to the direction of the force for pushing the movable unit 20 upward, applied by the extending pop-up springs 31. That is, the downward component force F1, acting on the pawl 34d, acts as a brake for reducing the rising speed of the movable unit 20. As the movable unit 20 comes closer to the highest point (end point) of the pop-up spring movement stroke, the moving speed becomes lower. This makes it possible to obtain an effect of reducing impact and noise caused at or near the end point of the pop-up spring movement stroke of the movable unit 20 by action of the pop-up springs 31.

In the state shown in FIG. 7C, the left end of the toggle spring 35 has been pushed up by the first latching pin 22a to the same level as the right end of the same, and the one-dot chain line L1 and the two-dot chain line L2 overlap each other in a horizontally extending state. In this case, moment (component force F1) applied to the pawl 34d of the assist lever 34 as the point of application becomes equal to 0 degrees, and the load of the toggle spring 35 neither acts on the assist lever 34 in the direction indicated by the arrow A (counterclockwise direction, as viewed in FIGS. 7A and 7B) nor in a direction (second arc direction) indicated by an arrow B (clockwise direction, as viewed in FIG. 7D), so that the toggle spring 35 maintains its neutral state. Note that as described hereinafter, if the toggle spring 35 passes the neutral state and the left end becomes higher than the right end, the direction of the component force F1 acting on the pawl 34d is reversed by the action of the toggle spring 35, whereby the assist lever 34 is rotated in the direction indicated by the arrow B. Therefore, a state in which the crossing angle θ formed by the one-dot chain line L1 and the two-dot chain line L2 is equal to 0 degrees and the one-dot chain line L1 and the two-dot chain line L2 overlap each other in the horizontal direction is referred to as the inflexion point of the toggle spring 35. Note that when the toggle spring 35 passes the inflexion point, inclination of the two-dot chain line L2 with respect to the one-dot chain line L1 is reversed.

Then, FIG. 6D shows a state in which the movable unit 20 has been popped up and stopped.

When the first latching pin 22a pushes the assist lever 34 slightly upward from the state shown in FIG. 7C due to the action of the pop-up springs 31 returning to the equilibrium length, the left end of the toggle spring 35 becomes higher than the right end, so that the toggle spring 35 passes the inflexion point where the one-dot chain line L1 and the two-dot chain line L2 overlap each other. At this time, the moment acting on the pawl 34d as the point of application is changed into moment in the direction indicated by the arrow B (upward).

Figure 7D:
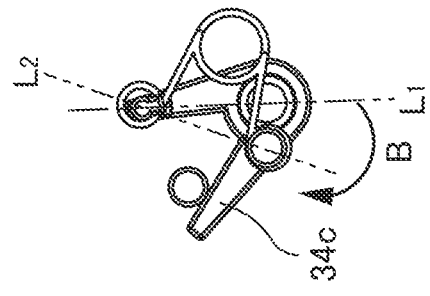

In FIG. 7D corresponding to FIG. 6D, the assist lever 34 has been rotated in the direction B, and the upper surface of the second contact portion 34c of the assist lever 34 is brought into abutment with the first latching pin 22a to push the first latching pin 22a upward more than the state shown in FIG. 6C. The first latching pin 22a is pushed upward more than the state shown in FIG. 6C, whereby the movable unit 20 sufficiently projects from the image pickup apparatus body to reach the use position.

The assist lever 34 and the toggle spring 35 that rotates the assist lever 34 are arranged in a positional relationship in which the assist lever 34 is brought into contact with the first latching member (22a) of the movable unit 20 before the movable unit 20 reaches the end point of the movement stroke by which the movable unit 20 is moved by the pop-up springs 31. Further, this positional relationship is a relationship in which when the pop-up springs 31 return to the equilibrium length, the first latching member (22a) of the movable unit 20 can push the left end (pawl 34d) of the toggle spring 35 upward slightly more than the state shown in FIG. 7C.

As described above, the first latching pin 22a is pushed upward more than the state shown in FIG. 6C by the extension force of the pop-up springs 31 returning to the equilibrium length, whereby the toggle spring 35 passes the inflexion point, and pushes up the pawl 34d as the point of application in the direction B. This causes the movable unit 20 to further rise, reach the use position, and stop. In the state in which the movable unit 20 has been popped up and stopped, the movable unit 20 is stopped by the E rings 24 of the guide bars 23, which are brought into abutment with the upper part of the EVF holder 30, as shown in FIG. 5B.

The movement stroke of the movable unit 20 becomes longer than a pop-up spring movement stroke exhibited in a case where only the pop-up springs 31 are used, so that the movement stroke is increased. The speed at which the second contact portion 34c of the assist lever 34 pushes up the first latching pin 22a, i.e. the rising speed of the movable unit 20 after the toggle spring 35 passing the inflexion point thereof becomes higher than in the case where the movable unit 20 performs upward movement, in which the rising speed is braked, up to the state shown in FIG. 6C.

Figure 8:
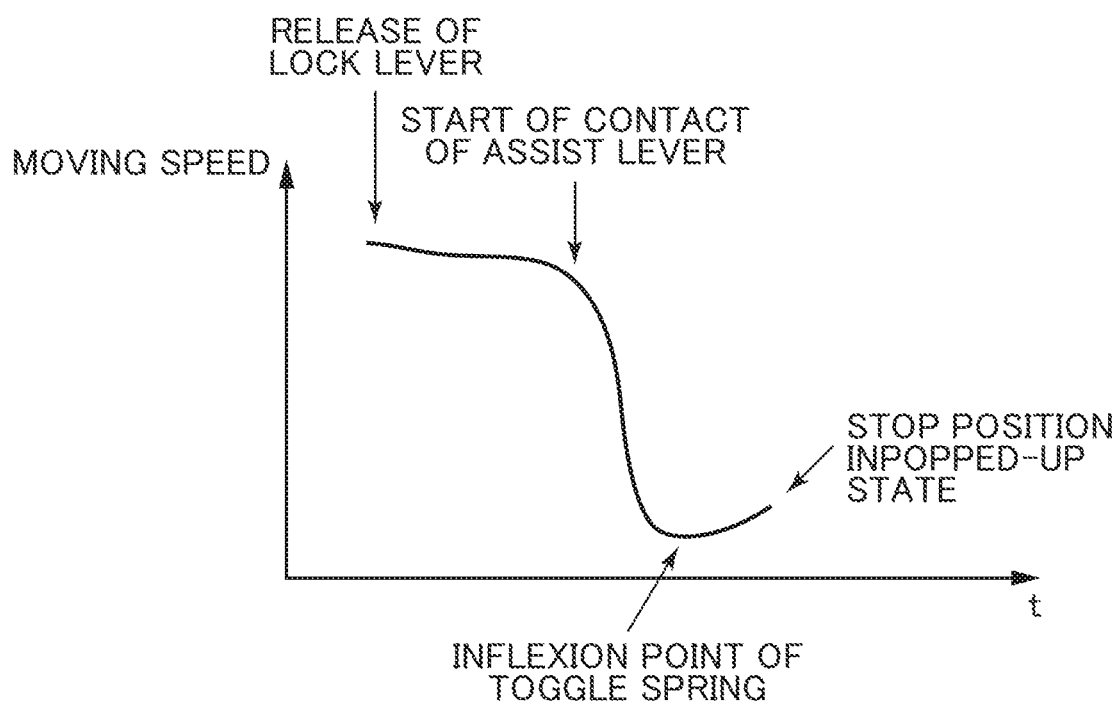
FIG. 8 is a graph showing a moving speed when popping up the electronic viewfinder.

The following description will be given of changes in the operation speed when popping up the electronic viewfinder 20. FIG. 8 is a graph showing the moving speed when popping up the electronic viewfinder 20. A vertical axis represents the moving speed of the electronic viewfinder 20 popped up from the accommodated position to the use position, and a horizontal axis represents an elapsed time t.

Referring to FIG. 8, when the lock lever 33 is released, the pop-up operation of the movable unit 20 is started, and the movable unit 20 is moved upward at high speed until the first latching pin 22a is brought into abutment with the first contact portion 34b of the assist lever 34. After that, the assist lever 34 is urged in the direction A in FIGS. 7A and 7B until the pop-up operation causes the toggle spring 35 to reach the inflexion point thereof, and hence load in a direction opposite to the pop-up direction is applied to the first latching pin 22a, which reduces the moving speed of the movable unit 20. After the pop-up operation has caused the toggle spring 35 to pass the inflexion point thereof, the assist lever 34 is urged in the direction B in FIG. 7D, and hence load in the same direction as the pop-up direction is applied to the first latching pin 22a, which slightly increases the moving speed of the movable unit 20.

According to the present embodiment, when the movable unit 20 approaches the end point of the pop-up spring movement stroke, by the urging force of the pop-up springs 31, the first latching pin 22a is brought into contact with the first contact portion 34b of the assist lever 34. Then, the first latching pin 22a urged by the pop-up springs 31 pushes the pawl 34d at the tip end of the first contact portion 34b upward, and after the toggle spring 35 passes the inflexion point thereof, the first latching pin 22a is brought into contact with the second contact portion 34c of the assist lever 34. When the first latching pin 22a is brought into contact with the second contact portion 34c of the assist lever 34, moment in the direction B, applied by the toggle spring 35 having passed the inflexion point, acts on the assist lever 34. This causes the assist lever 34 to be rotated in the direction B, whereby the first latching pin 22a is further pushed upward. Because of the first latching pin 22a being pushed upward, the movable unit 20 is moved beyond the pop-up spring movement stroke to a still higher position. Therefore, it is possible to positively move the movable unit 20 to the pop-up position without increasing the size of the apparatus body, and extend the movement stroke more than in the conventional technique employing only the pop-up springs 31.

Further, according to the present embodiment, by combining the assist lever 34 and the toggle spring 35, the toggle spring 35 operates to reduce the pop-up speed of the movable unit 20 when the toggle spring 35 reaches the inflexion point. As a result, it is possible to reduce impact and noise caused at or near termination of the pop-up operation of the movable unit 20.

In the present embodiment, it is preferable to affix a shock-absorbing member to at least one of respective portions the first latching pin 22a and the assist lever 34 which are brought into contact. This makes it possible to reduce impact and reduce noise caused when the first latching pin 22a and the assist lever 34 are brought into contact with each other.

Figure 9A:
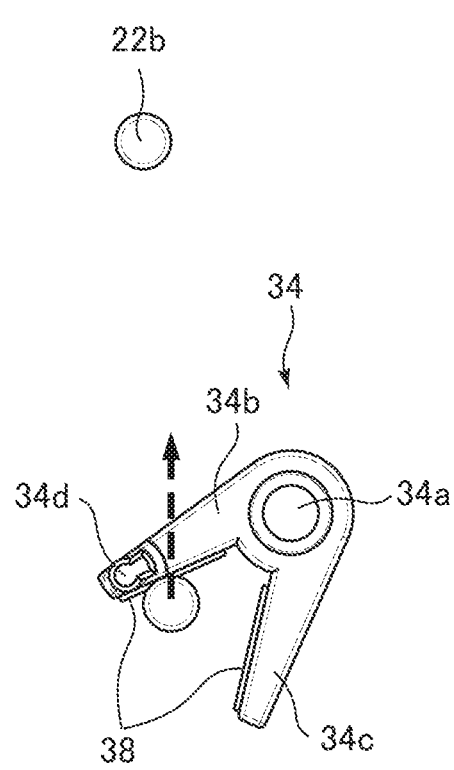
FIGS. 9A and 9B are views useful in explaining the operations of the assist lever and a first latching pin, which are performed when the assist lever and the first latching pin are brought into contact with each other.
Figure 9B:
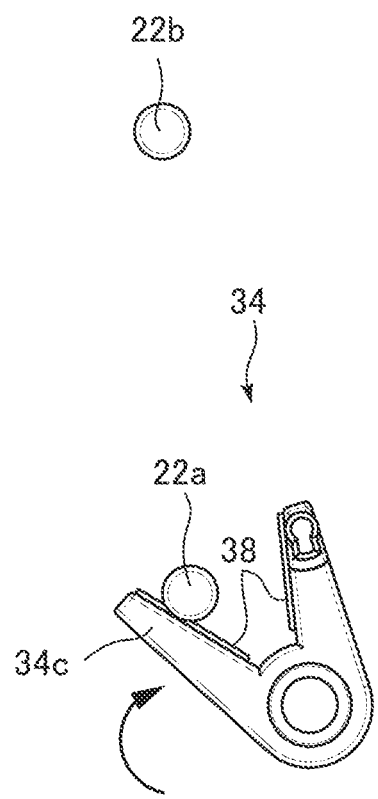

FIGS. 9A and 9B are views useful in explaining the operations of the assist lever 34 and the first latching pin 22a, performed when they are brought into contact with each other.

FIG. 9A shows a state in which the first latching pin 22a has been brought into abutment with the first contact portion 34b of the assist lever 34 in the middle of the pop-up operation of the electronic viewfinder 20. Further, FIG. 9B shows a state in which the pop-up operation has progressed to cause the toggle spring 35 to pass the inflexion point thereof (see FIG. 7C), thereby causing the assist lever 34 to be rotated in the urging direction indicated by the arrow B, so that the second contact portion 34c has been brought into abutment with the first latching pin 22a.

Cushion members 38 each formed of a flexible material, as respective shock-absorbing members, are affixed to contact surfaces of the first contact portion 34b and the second contact portion 34c of the assist lever 34, which are brought into contact with the first latching pin 22a. By affixing the cushion members 38, impact caused when the first latching pin 22a is brought into abutment with the first contact portion 34b (see FIG. 9A) and impact caused when the first latching pin 22a is brought into abutment with the second contact portion 34c (see FIG. 9B) are absorbed by the cushion members 38. Therefore, it is possible to reduce impact noise occurring when the electronic viewfinder 20 is popped up.

Note that it is preferable to affix the cushion member 38 to an upper surface, as appearing in FIG. 9A, of the first contact portion 34b of the assist lever 34 as well. This makes it possible to reduce impact and impact noise, caused by abutment between the second latching pin 22b and the upper surface of the first contact portion 34b of the assist lever 34 when the movable unit 20 returns from the use position to the accommodated position.

Further, in the present embodiment, it is preferable to use members each formed of a conductive material, as the assist lever 34 and the cushion member 38. With this, in a case where the movable unit 20 is in the accommodated position, the first contact portion 34b of the assist lever 34 is brought into contact with the second latching pin 22b, and thereby makes it possible to electrically connect between the movable unit 20 and the EVF holder 30. Further, in a case where the movable unit 20 is in the use position, the second contact portion 34c of the assist lever 34 is brought into contact with the first latching pin 22a, and thereby makes it possible to electrically connect between the movable unit 20 and the EVF holder 30. By electrically connecting between the movable unit 20 and the EVF holder 30, it is possible to make the pop-up operation smooth, and suppress occurrence of noise.

Although in the present embodiment, to the arrangement for popping up the electronic viewfinder 20, a combination of the toggle spring 35 and the assist lever 34 is applied, the member to be popped up is not limited to the electronic viewfinder 20. That is, the above-mentioned combination can be applied not only as a mechanism for popping up the electronic viewfinder 20 including the eyepiece 28, but also as a mechanism for popping up a strobe device including a light emission section or a like other device.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-218368 filed Nov. 21, 2018, which is hereby incorporated by reference herein in its entirety.

What is claimed is:

1. An electronic apparatus comprising:
an apparatus body;
a movable member configured to be movable between an accommodated position within the apparatus body and a use position in which the movable member is projected from the apparatus body;
a fixed member configured to slidably hold the movable member and fixed to a predetermined position in the apparatus body;
an urging unit configured to urge the movable member from the accommodated position toward the use position;
a lever member rotatably held by the fixed member;
a first latching member fixed to the movable member;
an urging member that has one end engaged with the lever member and the other end engaged with the fixed member, and urges the lever member such that the lever member is caused to be rotated,
wherein the lever member urges the lever member in a first arc direction, and urges the lever member in a second arc direction opposite to the first arc direction after passing an inflexion point,
wherein the lever member includes a contact portion that is brought into contact with the first latching member when the movable member reaches an end point of a movement stroke by which the movable member is moved by an urging force of the urging unit, and
wherein the lever member is brought into contact with the first latching member to urge the movable member in a direction opposite to a direction in which the movable member is urged by the urging unit, before the movable member reaches the end point of the movement stroke, and after the movable member has reached the end point of the movement stroke, the lever member is in contact with the first latching member to urge the movable member in the same direction as the direction in which the movable member is urged by the urging unit.

2. The electronic apparatus according to claim 1, wherein when the movable member reaches the end point of the movement stroke, the urging member reaches the inflexion point.

3. The electronic apparatus according to claim 2, wherein a straight line connecting the center of a rotational shaft of the lever member and the center of an engagement portion for engagement between the lever member and the urging member, and a straight line connecting the centers of opposite right and left ends of the urging member overlap each other at a crossing angle of 0 degrees.

4. The electronic apparatus according to claim 1, wherein the lever member includes a first contact portion and a second contact portion which rotate about a rotational axis, and
and wherein before the urging member reaches the inflexion point, the first contact portion is brought into contact with the first latching member, and after the urging member has reached the inflexion point, the second contact portion is brought into contact with the first latching member.

5. The electronic apparatus according to claim 4, wherein shock-absorbing members are affixed to surfaces of the first contact portion and the second contact portion of the lever member, respectively.

6. The electronic apparatus according to claim 5, wherein the lever member and the shock-absorbing member are formed of a conductive material, and the movable member has a second latching member disposed at a location spaced from the first latching member in a moving direction of the movable member,
wherein in a case where the movable member is in the accommodated position, the first contact portion of the lever member is brought into contact with the second latching member to electrically connect between the movable member and the fixed member, and in a case where the movable member is in the use position, the second contact portion of the lever member is brought into contact with the first latching member to electrically connect between the movable member and the fixed member.

7. The electronic apparatus according to claim 6, wherein in a case where the movable member is in the accommodated position, the second latching member pushes the first contact portion of the lever member to prevent the lever member from rotating.

8. The electronic apparatus according to claim 7, wherein the movable member is an electronic viewfinder including an eyepiece, or a strobe device including a light emission section.

9. The electronic apparatus according to claim 1, wherein the lever member urges the movable member in a direction opposite to the direction in which the movable member is urged by the urging unit, when the lever member is urged in the first arc direction, and urges the movable member in the same direction as the direction in which the movable member is urged by the urging unit, when the lever member is urged in the second arc direction.

10. The electronic apparatus according to claim 1, wherein the moving speed of the movable member urged by the urging unit becomes lower as the movable member comes closer to the end point of the movement stroke.

11. The electronic apparatus according to claim 1, wherein after the movable member has reached the end point of the movement stroke, the lever member urges the first latching member to move the movable member to the use position.

* * * * *